Figure 1:
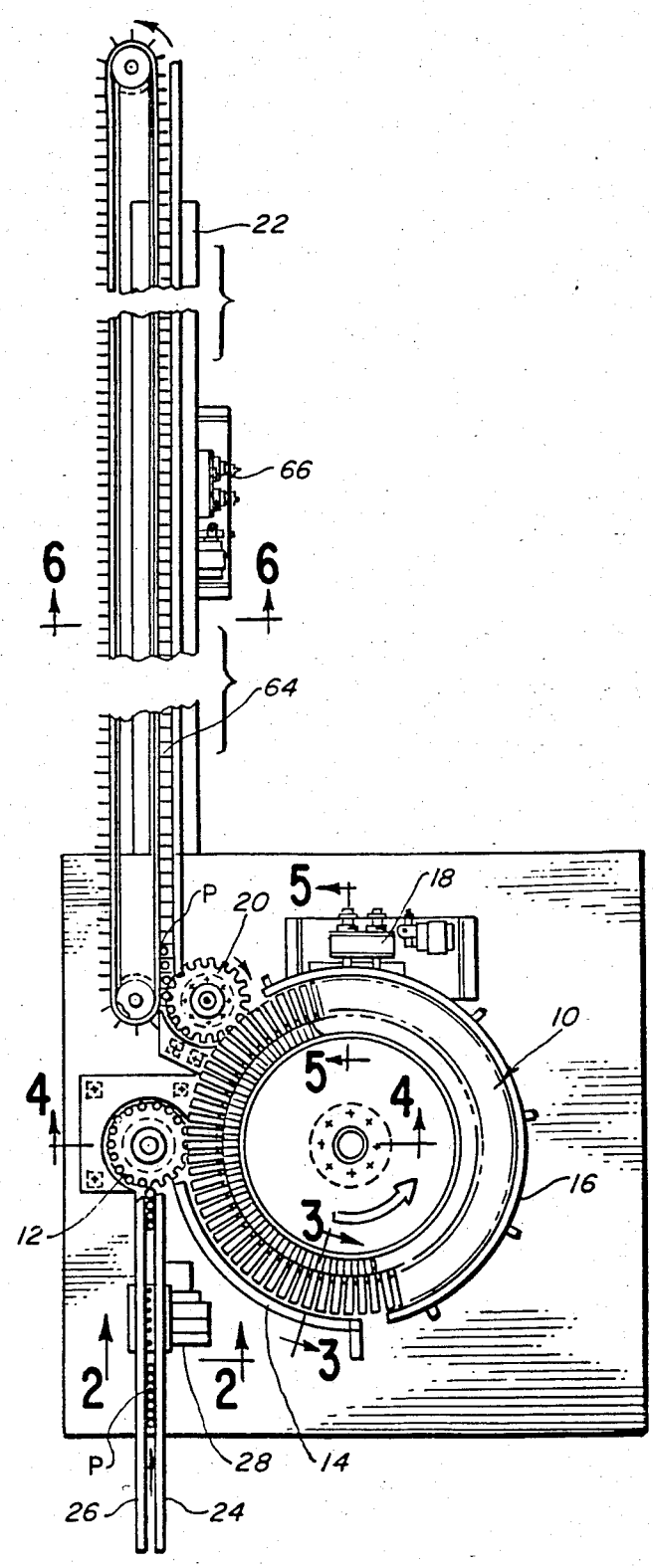

United States Patent [19]

Villanueva et al.

[11] Patent Number: 4,632,053
[45] Date of Patent: Dec. 30, 1986

[54] APPARATUS FOR COATING CONTAINERS

[75] Inventors: James G. Villanueva, Snellville; John D. Matlack, Lilburn; Shelton E. Lewis, Norcross; John F. E. Pocock, Stone Mountain; Charles A. Cole, Gainesville, all of Ga.

[73] Assignee: Amoco Corporation, Chicago, Ill.

[21] Appl. No.: 754,415

[22] Filed: Jul. 12, 1985

Related U.S. Application Data

[62] Division of Ser. No. 597,090, Apr. 5, 1984, Pat. No. 4,534,995.

[51] Int. Cl.⁴ .......................... B05C 3/10; B05C 11/02
[52] U.S. Cl. ........................................ 118/66; 118/72; 118/102; 118/425; 118/426
[58] Field of Search ................. 118/102, 425, 426, 66, 118/72

[56] References Cited

U.S. PATENT DOCUMENTS

| | | | |
|---|---|---|---|
| 2,301,293 | 11/1942 | Kronquist | 118/426 X |
| 2,544,199 | 3/1951 | Vredenberg | 118/426 X |
| 3,150,996 | 9/1964 | Johnson | 118/102 |
| 3,341,353 | 9/1967 | Johnson | 118/426 X |
| 4,036,168 | 7/1977 | Laliberte et al. | 118/675 |

Primary Examiner—John P. McIntosh
Attorney, Agent, or Firm—Wallace L. Oliver; William T. McClain; William H. Magidson

[57] ABSTRACT

A method for treating plastic containers with a resin to improve barrier properties thereof including conditioning with an ionizing gas, dipping container in latex of barrier resin and drying container including removing drop from bottom thereof. Apparatus for carrying out the process is shown.

5 Claims, 7 Drawing Figures

APPARATUS FOR COATING CONTAINERS

This is a division of application Ser. No. 597,090, filed Apr. 5, 1984, now U.S. Pat. No. 4,534,995.

This invention relates to a method and apparatus for coating containers and container preforms. Preforms are the products from which containers are made by blow molding. Unless otherwise indicated the term "container" is used herein to include both the preform and bottle blown therefrom. A number of plastic materials have been used for containers and many are quite suitable. Some products such as carbonated beverages and foodstuffs need a container which is resistant to the transfer of gases such as carbon dioxide and oxygen. Coating of such containers has been suggested for many years.

A resin now widely used in the container industry is polyethylene terephthalate (PET). In one method of commercial operation, preforms are made by injection molding and these preforms blown into bottles. In the commercial two-liter size, a shelf life of 12 to 16 weeks can be expected but for smaller bottles, such as half liter, the larger surface-to-volume ratio severely restricts shelf life. Carbonated beverages are normally pressured to 4 volumes of gas but if this pressure falls below approximately 3.4 volumes, the product is considered unsatisfactory.

For this reason, coating of the bottles or preforms with a film of a barrier resin has been suggested. Examples include Addleman U.S. Pat. No. 4,127,663 (1978) and UK Specification No. 1,528,504 (1978).

In view of the large number of bottles used, a rapid and efficient coating system is desired. Such a system results from the method and apparatus for coating preforms and is disclosed in the present application.

An object, therefore, of the present invention is to provide a new method for coating containers or container preforms.

A further object of our invention is to provide apparatus for carrying out this method.

Other objects and advantages of our invention will be apparent to those skilled in the art upon reading the present specification.

Broadly, our invention resides in a method of applying a barrier resin coating to a polyethylene terephthalate container or preform comprising neutralizing the static charge on said container, dipping said container into a dispersion or latex of the barrier resin to coat at least the lower two-thirds of said container, slowly removing said container from said latex, and drying said coating.

This invention will probably find its greatest use in which the container is a preform from which the bottle or other container is blown. An aqueous dispersion or latex of any film forming polymer can be employed to make the coating of the film forming polymer. Exemplary film forming polymers are homopolymers of vinyl chloride and copolymers of vinyl chloride with one or more other ethylenically unsaturated monomers sucvh as vinyl acetate, ethylene, propylene, acrylonitrile, methacrylonitrile, alkyl acrylates and methacrylates, homopolymers and copolymers of alkyl acrylates, alkyl methacrylates with themselves or with ethylenically unsaturated monomers such as those listed above, homopolymers of vinylidene chloride and copolymers of vinylidene chloride with at least one ethylenically unsaturated monomer such as vinyl chloride, acrylonitrile, alkyl acrylates and methacrylates and ethylenically unsaturated carboxylic acids, and polymers and copolymers of styrene, vinyl fluoride, vinylidene fluoride, tetrafluoroethylene, acrylonitrile and methacrylonitrile and vinyl ethers. Preferred film forming polymers are copolymers of vinylidene chloride and acrylonitrile optionally containing units derived from other monomers such as methyl acrylate, methyl methacrylate, vinyl chloride, acrylic acid, methacrylic acid, or itaconic acid. The dispersion or latex usually contains 40 to 80 percent solids.

The coating of the film forming polymer should be dried by heating to a temperature at which the polymer softens and fuses to a coherent film. The precise temperature required will depend on the nature of the polymer. For vinylidene chloride polymers, the coating is preferably dried at above 50° C., preferably above 60° C. The maximum temperature employed will depend, inter alia, on the nature of the substrate. Thus the use of drying temperatures above 95° C., when the article is an amorphous PET preform, is undesirable as the PET of the preform may start to crystallize during the drying process. Thus for PET preforms coated with vinylidene chloride copolymer dispersions, the drying temperature is preferably 75°–95 ° C. heated gas temperature.

An important feature of our invention is based upon the discovery that the container can be rapidly introduced into the latex but should be slowly removed. The slow removal aids in producing a uniform thin film coating of the barrier resin. The container should be introduced over a time ranging from 1 to 3 seconds and removed over a period of 7 to 14 seconds. In our work to date, we have preferred an entry time of 2 seconds followed by removal over a 10-second period. To avoid waves or the production of a wake, the maximum linear speed through the latex bath should not exceed 2 inches per second. The depth of dipping can vary but generally at least two thirds of the length of the preform is coated, preferably to a point corresponding to the fill level of a blown container.

Following the dipping operation, the coating is dried by passing the container through an oven supplied with heated gas, normally air.

In observing the operation of this process, it was noted that the last area to dry is the bottom of the container where a drop of liquid collects. This drop is preferably removed one or more times during the drying step.

Another important feature of the invention is the use of a system to remove static electricity from the container. A positively charged container will collect dust from the air and small particles (latex solids) that come out of the latex. These materials result in imperfections in the coating. We have found that conditioning the container before introduction into the latex with a system of ionized air will produce a slightly negative charge on the container and will avoid these problems. A suitable source of ionized air is an Aerostat ionizing blower, type AS-10A, made by the Simco Co., Inc. of Hatsfield, Pa.

In another aspect, our invention resides in apparatus for coating plastic containers comprising a stationary frame, a carousel having upper and lower platens rotatably mounted on said frame, means to drive said carousel, entrance and exit positions on said carousel, means to supply containers to said entrance position, a cam mounted on said frame surrounding said carousel, a plurality of pairs of support rods mounted on radii of said carousel extending between upper and lower platens, a support arm mounted on each pair of support rods, a neck ring support mounted on each neck ring support arm, a cam follower mounted on each neck ring support arm adapted to ride upon said cam, a spring loaded plunger mounted on each support arm, means to feed serially containers to each said neck ring support at said entrance position, a coater tank having first and second ends on said frame located downstream of said entrance position, a depression on said cam downstream of first end of said coater tank, the follower on said support arm riding downwardly in said depression to dip a container into said coater tank a predetermined distance and to remove said container from said coater tank, an oven positioned on said frame around said cam downstream of said coater tank, means to remove a drop of liquid from the bottom of a coated container during passage through said oven, means to remove containers from said carousel at said exit position, and means to remove serially containers from each said neck ring support at said exit position. Depending upon the speed of the passage of the coated container through the oven, insufficient drying may result. In such a case, we can use a second oven located downstream of said exit position.

Figure 2:
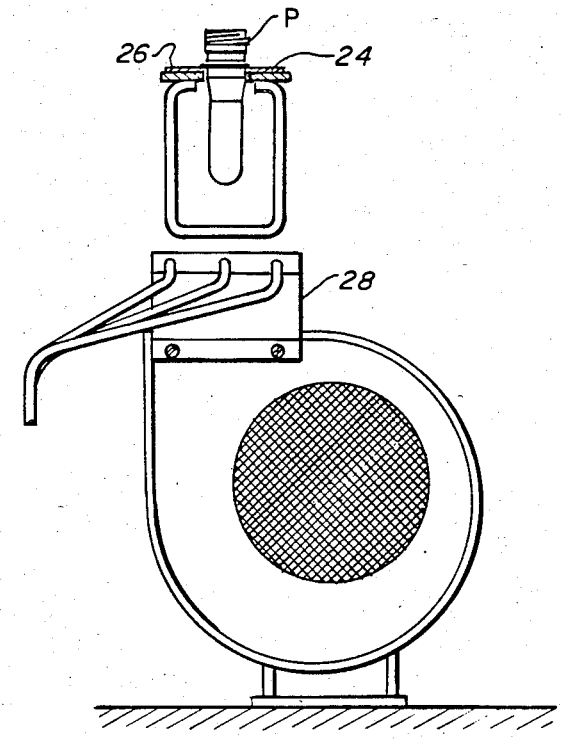
Figure 3:
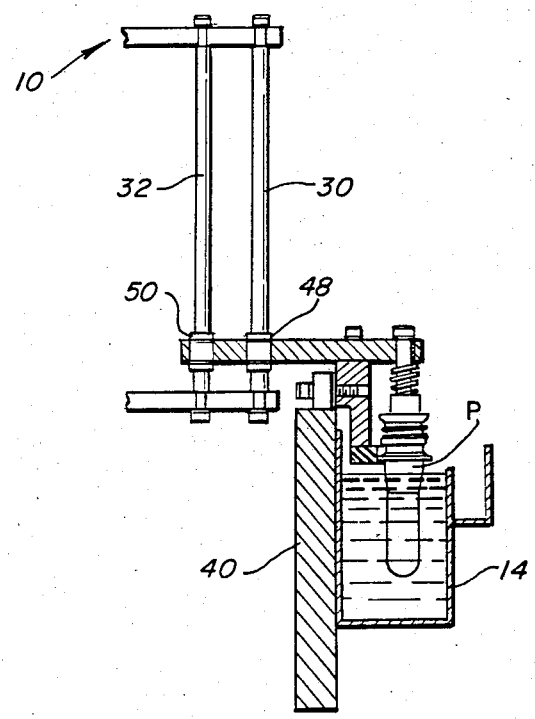
Figure 4:
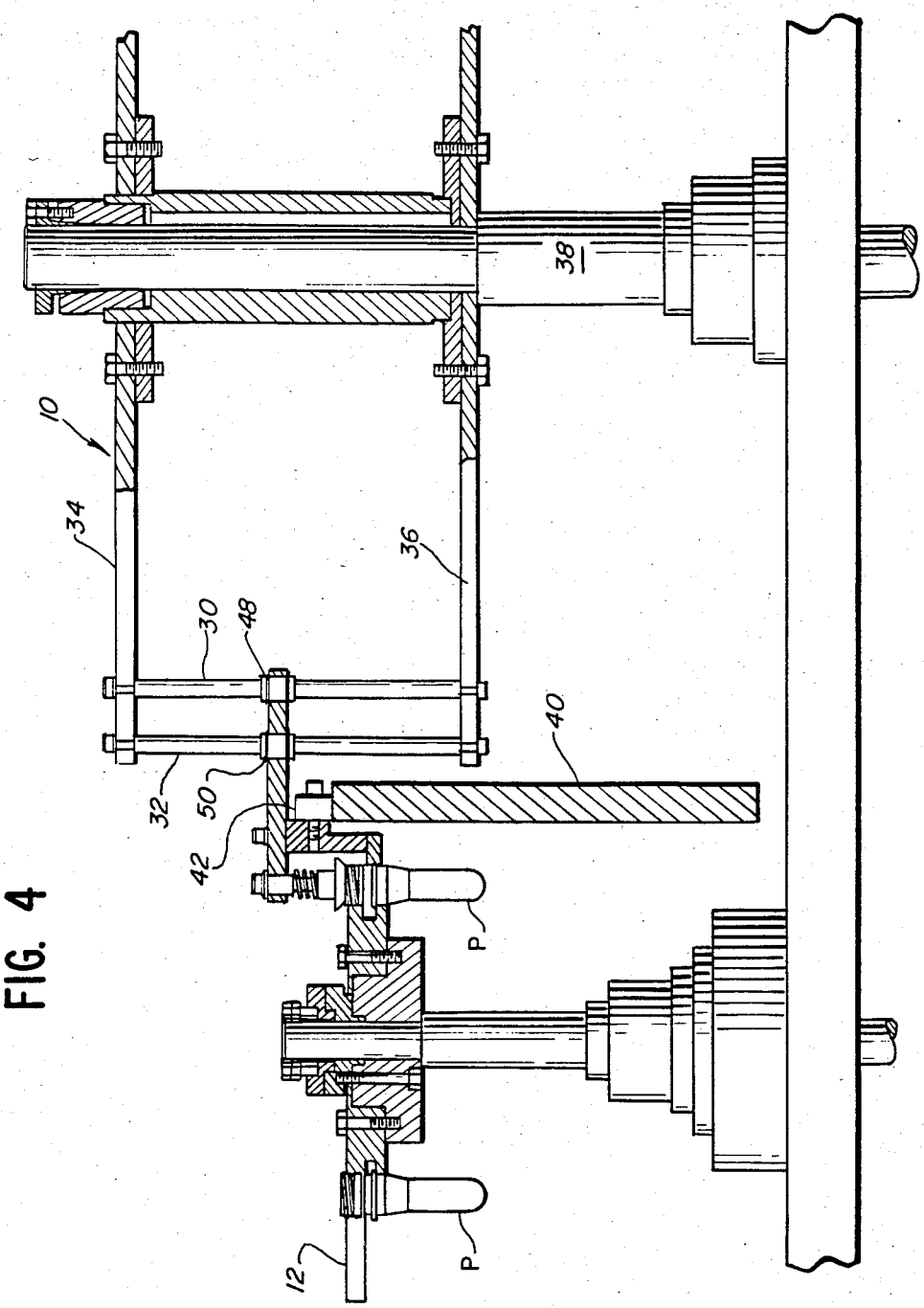
Figure 5:
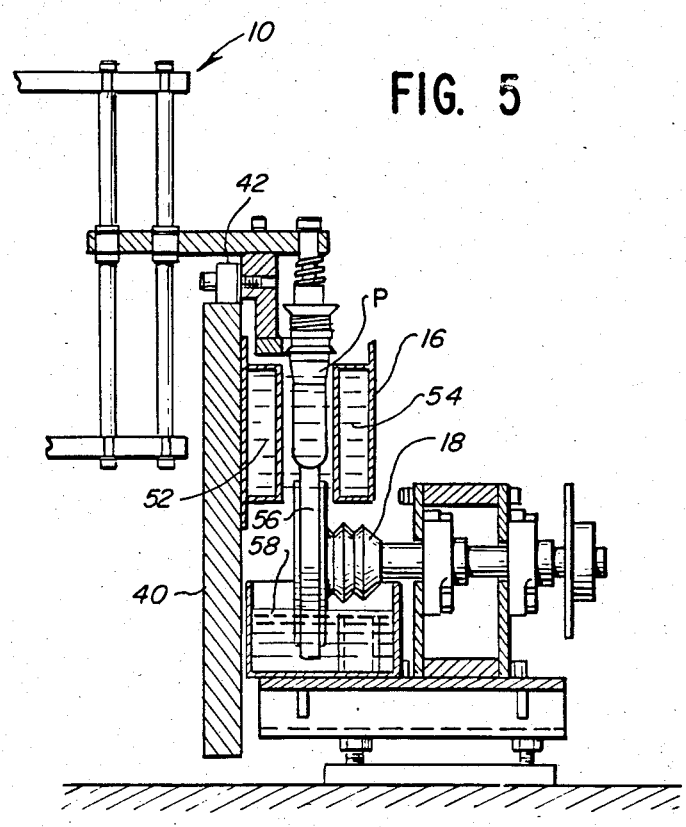
Figure 6:
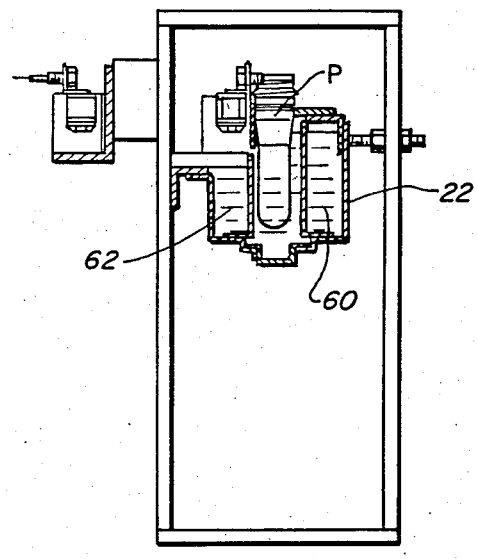
Figure 7:
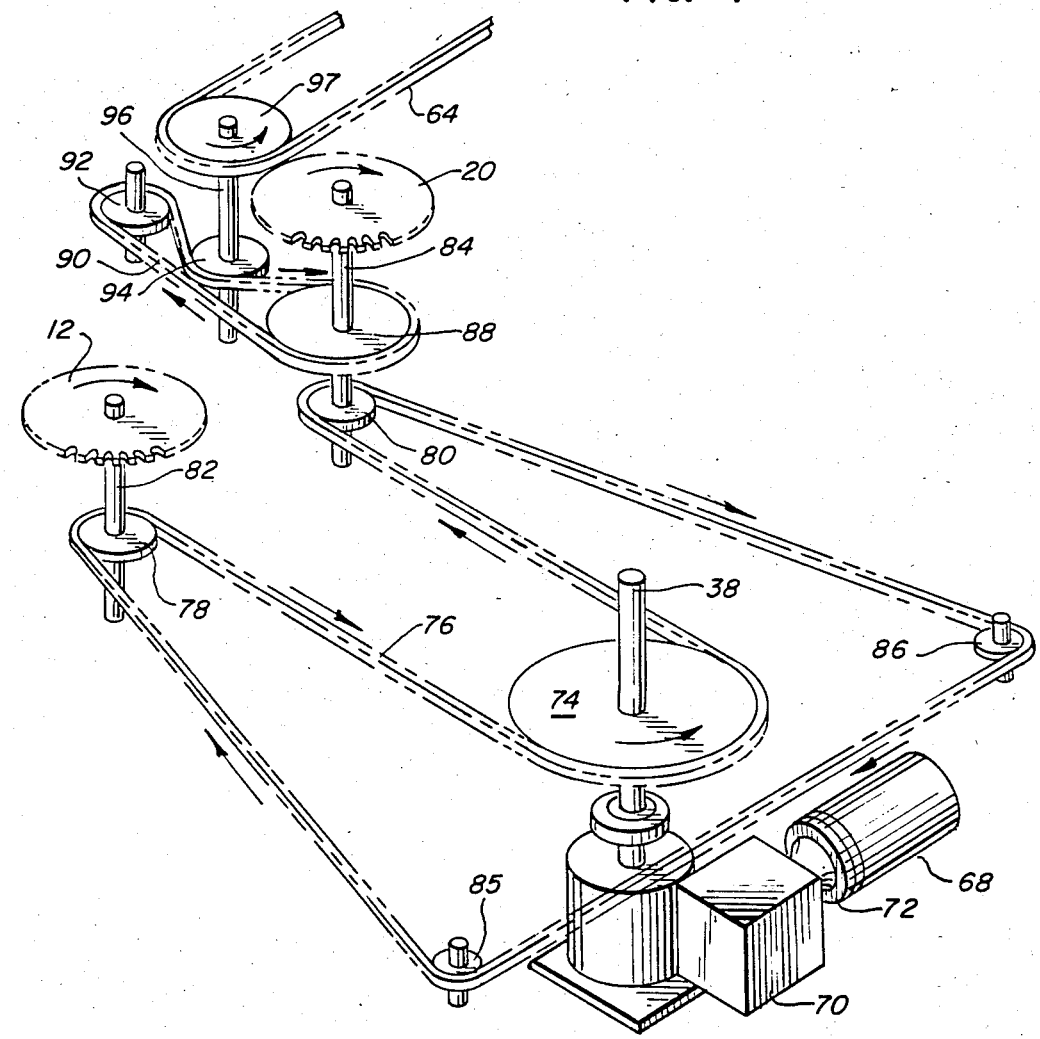

Accompanying and forming a part of this specification is a drawing comprising:

FIG. 1, a top plan view of the apparatus of our invention;

FIG. 2, a view on line 2—2 of FIG. 1 showing the ionized gas supply system;

FIG. 3, a cross-section view on line 3—3 of FIG. 1 showing a preform immersed in the film forming latex;

FIG. 4, a cross-section on line 4—4 of FIG. 1 showing the entrance star wheel and a portion of the main rotating carousel;

FIG. 5, a cross-section on line 5—5 of FIG. 1 showing a dabber wheel adapted to remove a drip of liquid from a preform;

FIG. 6, a cross-section of an oven extension used in our apparatus;

FIG. 7, isometric drawing of the drive arrangement for our apparatus.

Now directing attention to the drawing where the container or preform is designated P the apparatus will be further described along with certain details of the operation of this apparatus. Obviously, blown bottles could be substituted for the preforms with suitable dimensional changes. For a thorough understanding, it will be necessary to consider the several figures of drawing together where common numerals are used for like members.

The principle elements shown on this drawing include a rotating carousel 10, an entrance star wheel 12, a dip tank 14, an oven 16, a dabber wheel assembly 18, an exit star wheel 20, and an oven extension 22.

The feed system to the entrance star wheel 12 comprises two support rails or rods 24 and 26 so sized as to support the container by a neck ring thereon. This pair of rails is elevated higher at the preform entrance than at the entrance star wheel 12 to provide gravity feed into star wheel 12. The containers can be supplied in any suitable manner to the space between rails 24 and 26. Positioned at a point between the ends of support rails 24 and 26 and star wheel 12 is ionizing gas supply generator 28. (See FIG. 2.) As described above, element 28 is a Simco ionized gas generator. A blower is provided to force gas, normally air, through ionizing generator 28 over the containers carried by rails 24 and 26. The entrance star wheel 12 transfers containers onto a spring loaded holder assembly best shown in FIG. 4. The operation of such star wheel and holder assemblies are all known in the art. In this case, the assembly rides upon guide shafts 30 and 32, the shaft being mounted between upper carousel plate 34 and lower carousel plate 36 of carousel 10. (See FIG. 4.) Carousel 10 is powered through main drive shaft 38.

The containers, after being inserted into the holder assembly travel to an elevation determined by cam 40 and cam follower wheel 42. The cam and follower wheel are shown in FIGS. 4 and 5. The spring loaded holder assembly is guided on guide shafts 30 and 32 by linear bearings 48 and 50.

After the preform has been positioned into the spring loaded holder assembly, it is transported around the carousel and dipped into coater tank 14. The top surface of the cam 40 assembled with coater tank 14 is shaped to direct a fast (1 to 3 seconds) submergence of the preform but a slow (7 to 14 seconds) emergence.

Once the containers are dipped, they are passed through a circular oven 16 for the remainder of the path around the carousel to a point just prior to exit wheel 20. This circular oven 16 consists of two ducts 52 and 54 provided with perforated surfaces facing the preform. (See FIG. 5.) Heated air from a forced air source (not shown), serves to dry the coating on the container.

In the process of drying, a small drip on the bottom of the container is the last remaining area to dry. To speed the drying of this area, a dabber wheel 56 is provided which rotates with the movement of the preforms and removes the water soluble drip (see FIG. 5). Dabber wheel 56 rotates with the lower portion thereof submerged in a water bath 58. If desired, excess water can be removed from the dabber wheel by squeezing against another roller (not shown). The rotation of the dabber wheel 56 is accomplished by a tachometer, more fully described hereafter. In cases where insufficient drying results from a passage through oven 16, an oven extension 22 can be used to complete the drying process. In FIG. 6, this oven is shown comprising two metal ducts 60 and 62 provided with perforated inner surfaces.

The containers are transferred from the spring loaded holder assembly onto a chain carrier system 64 associated with oven 22 by exit star wheel 20. The chain carrier supports the containers through oven 22. If necessary, a second dabber wheel assembly 66 is provided in oven 22.

The drive system is illustrated in FIG. 7 although alternatives to this system will be apparent to those skilled in the art. The main drive motor 68 is connected to gear box 70 and between these elements is tachometer 72. The function of tachometer 72 is to regulate the speed of the motors operating dabber wheels 56 and the similar wheel in dabber wheel assembly 66. Connected to the output shaft of gear box 70 is main drive shaft 38, this driving the carousel 10. This drive shaft 38 not only moves the carousel, but it also drives sprocket 74. By means of roller chain 76 driven by sprocket 74, sprocket 78 and sprocket 80 are driven.

Sprocket 78 connects to shaft 82 and drives the entrance star wheel 12.

Sprocket 80 connects to shaft 84 and drives exit star wheel 20. To obtain the correct rotation of all of these shafts, the movement of roller chain 76 requires two idler sprockets 85 and 86. These idler sprockets also serve as tension adjustment means. Attached to shaft 84 is another sprocket 88 which is used to drive chain carrier system 64, this system 64 being the drive through oven 22. The drive accomplished by additional roller chain 90 passing around sprockets 92 and 94. Sprocket 92 is used as an idler and chain tension adjustment member. Sprocket 94 is attached to shaft 96 which in turn drives sprocket 97.

The following example illustrates a preferred embodiment of the method of carrying out this invention but this should not be considered unduly limiting.

EXAMPLE

A series of preforms were treated with a polyvinylidene chloride latex having a solids level of 58 weight percent, a pH of 2, and a viscosity of 24 cps. The preforms were dipped at 75° F. The dipping was carried out by using a bath introduction rate of 5 inches per minute (2 seconds) and a removal at a rate of 20 inches per minute (8 seconds). Preforms were dried in an oven supplied with air in a temperature in the range of 75° C. to 95° C. The drip on the bottom of the preform was removed at the end of 60 seconds. Variations of oven temperature and drying times are shown in the following table.

| Oven Temp. | Oven Time | Dab Sequence After Entering Oven | Tip Dry To Touch After Dab |
| --- | --- | --- | --- |
| 75° C. | 60 sec. | 60 sec. | 60 sec. |
| 85° C. | 60 sec. | 60 sec. | 60 sec. |
| 95° C. | 60 sec. | 60 sec. | 40 sec. |
| 75° C. | 90 sec. | 60 sec. | 30 sec. |
| 85° C. | 90 sec. | 60 sec. | 25 sec. |
| 95° C. | 90 sec. | 60 sec. | 20 sec. |

Preforms suitable for the production of half-liter containers were coated in the apparatus of this invention. Bottles were blown, filled, and carbonation retention tests made. Results indicated a shelf life of approximately 14 weeks.

Those skilled in the art will recognize that considerable variation in the specific details given can be carried out and these variations are within the general scope of our invention.

We claim:

1. Apparatus for coating plastic containers comprising a stationary frame, a carousel having upper and lower platens rotatably mounted on said frame, means to drive said carousel, entrance and exit positions on said carousel, means to supply said containers to said entrance position, a cam mounted on said frame surrounding said carousel, a plurality of pairs of support rods mounted on radii of said carousel extending between upper and lower platens, a support arm mounted on each pair of support rods, a neck ring support mounted on each support arm, a cam follower mounted on each neck ring support adapted to ride upon said cam, a spring loaded plunger mounted on each support arm, means to feed serially containers to each said neck ring support at said entrance position, a coater tank having first and second ends on said frame located downstream of said entrance position, a depression on said cam downstream of first end of said coater tank, the follower on said support arm riding downwardly in said depression to dip a container into said coater tank a predetermined distance and to remove said container from said coater tank, an oven positioned on said frame around said cam downstream of said coater tank, means to remove a drop of liquid from the bottom of a coated container during passage through said oven, means to remove containers from said carousel at said exit position, and means to remove serially containers from each said neck ring support at said exit position.

2. The apparatus of claim 1 including a second oven located downstream of said exit position.

3. The apparatus of claim 1 including a static eliminator positioned adjacent said means to supply preforms to said entrance position.

4. The apparatus of claim 3, wherein said static eliminator comprises a means to generate an ionized gas.

5. The apparatus of claim 1, wherein a top surface of said cam is shaped to direct a fast submergence of said container into said coater tank and a relatively slower emergence of said container from said coater tank.

* * * * *